(12) United States Patent
Schaade et al.

(10) Patent No.: US 7,702,079 B2
(45) Date of Patent: Apr. 20, 2010

(54) ADAPTER UNIT AND METHOD

(75) Inventors: Stephan Schaade, Buchloe (DE); Klaus Wille, München (DE)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 10/586,232

(22) PCT Filed: Jan. 11, 2005

(86) PCT No.: PCT/EP2005/050097

§ 371 (c)(1),
(2), (4) Date: Jul. 18, 2006

(87) PCT Pub. No.: WO2005/069644

PCT Pub. Date: Jul. 28, 2005

(65) Prior Publication Data

US 2007/0115946 A1    May 24, 2007

(30) Foreign Application Priority Data

Jan. 19, 2004   (DE) .................... 10 2004 002 680

(51) Int. Cl.
*H04M 1/24* (2006.01)
*H04M 7/00* (2006.01)
*G01R 31/08* (2006.01)

(52) U.S. Cl. ............ 379/9.05; 379/221.03; 379/221.04; 370/216

(58) Field of Classification Search ................ 379/9.05, 379/32.01, 112.02, 221.03, 221.04; 370/216–228, 370/242, 352–356
See application file for complete search history.

(56) References Cited

U.S. PATENT DOCUMENTS

| | | | |
|---|---|---|---|
| 6,272,209 B1* | 8/2001 | Bridger et al. ........... 379/27.01 |
| 7,012,888 B2* | 3/2006 | Schoeneberger et al. .... 370/217 |
| 7,583,615 B2* | 9/2009 | Schaade ..................... 370/254 |
| 2002/0101818 A1* | 8/2002 | Teixeira ..................... 370/217 |
| 2004/0190685 A1* | 9/2004 | Davies ....................... 379/9.05 |
| 2004/0223450 A1 | 11/2004 | Bridges et al. |

FOREIGN PATENT DOCUMENTS

| | | |
|---|---|---|
| EP | 1 037 429 A2 | 9/2000 |
| WO | WO 00/33519 | 6/2000 |
| WO | WO 01/06740 A2 | 1/2001 |

* cited by examiner

*Primary Examiner*—Quoc D Tran (57) ABSTRACT

In one aspect of the invention, emergency modes of operation for an adapter unit comprising a channel transmitter/receiver unit, a data packet transmitter/receiver unit, and a data insertion/data retrieval unit which inserts signaling data transmitted by the channel receiver unit into data packets and forwards the same to the data packet transmitter unit while retrieving signaling data from the data packets received by the data packet receiver unit and forwarding the same to the channel transmitter unit is provided. The adapter unit especially allows terminals of a branch to be connected in a fail-safe and simple manner to a central telecommunication system.

23 Claims, 4 Drawing Sheets

Branch office F1, S₀ adapter

Central telecommunication system

FIG 5 Branch office F1

FIG 6 Branch office F1

ADAPTER UNIT AND METHOD

CROSS REFERENCE TO RELATED APPLICATIONS

This application is the US National Stage of International Application No. PCT/EP2005/050097, filed Jan. 11, 2005 and claims the benefit thereof. The International Application claims the benefits of German application No. 102004002680.7 DE filed Jan. 19, 2004, both of the applications are incorporated by reference herein in their entirety.

FIELD OF INVENTION

The invention relates to a unit for the operation of an exchange line of a public telecommunications network at a telecommunication system. The unit contains a channel send/receive unit which sends signaling data to an exchange of a circuit-switched telecommunications network and which receives signaling data from the exchange. The signaling data complies with e.g. the protocol DSS1 (Digital Signaling Systems No. 1) of the ITU-T (International Telecommunication Union-Telecommunication Standardization Sector).

BACKGROUND OF INVENTION

Various private subscribers are attached to a public telecommunications network via individual lines or telecommunication systems. Exchanges of the public telecommunications network switch connections depending on the call numbers and monitor the charges and the utilization of user facilities.

SUMMARY OF INVENTION

By contrast, the telecommunication system is used for operating a private telecommunications network, e.g. a company telephone network. The telecommunication system is a system of the type HiPath 3000 or HiPath 4000 from the company Siemens AG. Attached to a telecommunication system are a multiplicity of subscribers whose call numbers and user facilities are predetermined by the telecommunication system. In particular, the telecommunication system is used for switching connections between the terminals of the private telecommunications network or for switching connections to or from a public telecommunications network or telephone network.

It is possible to conceive of a solution in which the unit is an adapter unit containing the following modules for a normal operating mode:
the channel send/receive unit,
a data packet send/receive unit which sends data packets into a data packet transfer network and which receives data packets from the data packet transfer network, and
a data insertion/extraction unit which inserts signaling data coming from the channel receive unit into data packets and forwards them to the data packet send unit and which extracts signaling data from data packets that are received from the data packet receive unit and forwards it to the channel send unit.

Using such an adapter unit, an exchange line leading to a branch office can be connected to a remote central telecommunication system with little switching effort, in particular without the need for a local telecommunication system in the branch office. It is nonetheless possible to utilize advantages which are otherwise only available using a local telecommunication system in the branch office.

However, it must also be ensured that terminals in the branch office remain operational even if the central telecommunication system fails or if the data packet transfer network fails.

The invention addresses the problem of specifying an adapter unit which offers simple construction and functional reliability. A method for operating a telecommunications network will also be specified.

The problem in relation to the unit is solved by an adapter unit having the features specified in the independent claim. Developments are specified in the dependent claims.

The adapter unit contains:
a channel send/receive unit which sends signaling data to an exchange of a circuit-switched telecommunications network and which receives signaling data from the exchange,
a data packet send/receive unit which at least in a normal operating mode sends data packets into a data packet transfer network and which receives data packets from the data packet transfer network,
a data insertion/extraction unit which at least in a normal operating mode inserts signaling data coming from the channel receive unit into data packets and forwards them to the data packet send unit and which extracts signaling data from data packets that are received from the data packet receive unit and forwards it to the channel send unit, and
an operating mode switchover unit which, in the event of a fault on the side of the data packet transfer network or in the event of faults in a telecommunication system operating on the data packet transfer network, switches over into an emergency operating mode in which telecommunication via the circuit-switched telecommunications network is ensured.

It is consequently a straightforward matter to allow telephone operation in the branch office even in the event of faults in a data packet transfer network to a central telecommunication system or in the event of a fault in the central telecommunication system.

In a first alternative development, in the emergency operating mode the operating mode switchover unit entrusts the forwarding of the signaling data to a different telecommunication system than in the normal operating mode. Conversely, in the emergency operating mode signaling data coming from this different telecommunication system is sent via the channel send unit. The functions of this different telecommunication system are preferably significantly limited in comparison with the central telecommunication system which is used in the normal operating mode, such that the switching-related and administrative burden is acceptable for the telecommunication system which is used in the emergency operating mode. For example, the telecommunication system which is used in the emergency operating mode supports only a few terminals, in particular fewer than 16 terminals. In addition, this telecommunication system does not contain any redundant modules.

In a development, the functions of the telecommunication system which is used in the emergency operating mode are provided in a telephone, in particular in an IP telephone. Modules and software in the IP telephone can be used both for providing the functions of the emergency telecommunication system and for providing the functions of the IP telephone when telephoning in both operating modes.

In a very simple second alternative development, in the emergency operating mode the operating mode switchover unit entrusts the forwarding of the signaling data to a subscriber terminal. Conversely, in the emergency operating mode signaling data coming from the subscriber terminal is sent via the channel send unit. This development is used in particular if the exchange line is a multiple device interface.

In a third alternative development, the adapter unit contains a protocol conversion unit which in the emergency operating mode is entrusted by the operating mode switchover unit to perform a protocol conversion of the signaling data into a signaling protocol for a data packet transfer network and preferably also vice versa. In the third alternative development, the adapter unit also contains a network access unit which in the emergency operating mode is entrusted by the operating mode switchover unit to perform network access functions for terminals of a data packet transfer network, in particular a gatekeeper function in accordance with a protocol of the H.323 protocol family of the ITU-T (International Telecommunication Union-Telecommunication Standardization Sector) or a SIP registrar function in accordance with the SIP protocol (Session Initiation Protocol) of the IETF (Internet Engineering Task Force) or a protocol which is based thereupon. The telephones of the branch office register with the adapter unit in the emergency operating mode.

In a fourth alternative development, the adapter unit again contains a protocol conversion unit, namely a so-called proxy unit, which in the emergency operating mode is entrusted by the operating mode switchover unit to perform a protocol conversion of the signaling data in accordance with e.g. DSS1 into a signaling protocol for a data packet transfer network and preferably also vice versa. In the fourth development, the adapter unit also contains a terminal unit which in the emergency operating mode is entrusted by the operating mode switchover unit to perform the function of a terminal in terminal-to-terminal connections of a data packet transfer network, in particular in peer-to-peer connections. Therefore the adapter unit does not have to provide a central registering function simultaneously for all telephones of the branch office.

In other alternative developments, other measures are adopted in order to maintain the telephone operation in a branch office in which the adapter unit is installed even in the event of a fault.

The invention relates in particular to a method for operating a telecommunications network, wherein said method includes the following steps being executed in a normal operating mode:
receiving signaling data of a circuit-switched telecommunications network (20, 22),
tunneling (160, 190) the received signaling data via a data packet transfer network (12),
processing the tunneled signaling data in a telecommunication system (14) in accordance with a signaling protocol.

BRIEF DESCRIPTION OF THE DRAWINGS

The invention is explained below with reference to the appended drawings, in which.

DETAILED DESCRIPTION OF INVENTION

Figure 1:
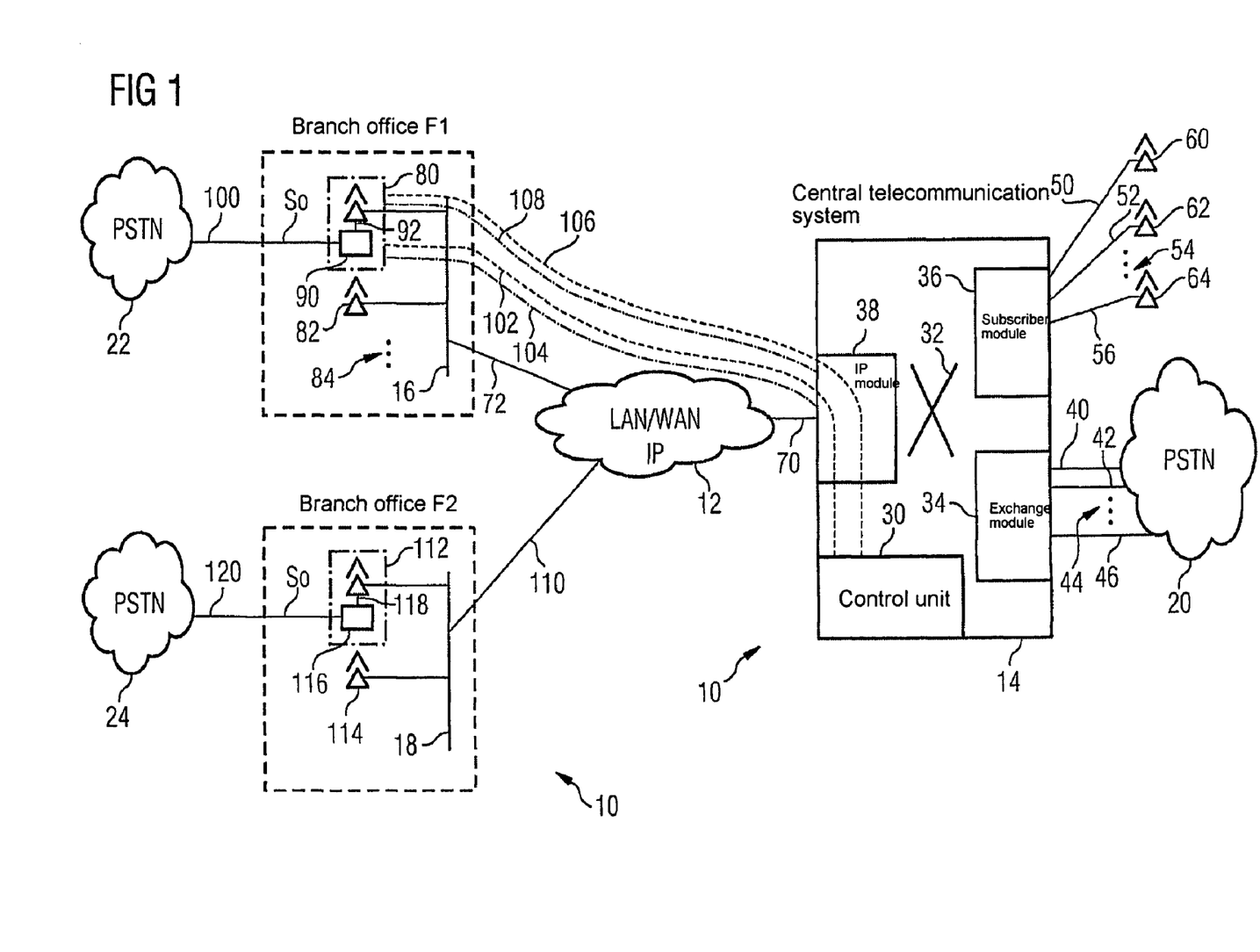
FIG. 1 shows the normal operating mode of a private telecommunications network in which voice data is also transferred via the Internet.

FIG. 1 shows the normal operating mode of a private telecommunications network 10 in which voice data is also transferred via the Internet 12. The telecommunications network 10 contains a central telecommunication system 14 and e.g. two branch office data packet transfer networks 16 and 18 in branch offices F1 and F2 respectively. The telecommunication system 14 switches telephone connections or video phone connections between the terminals of the private telecommunications network 10 and/or between these terminals and terminals on a public circuit-switched telecommunications network (PSTN—Public Switched Telecommunication Network), of which three local networks 20, 22 and 24 are illustrated in FIG. 1. In the exemplary embodiment, the local networks 20 to 24 belong to the same network operator. In the case of other exemplary embodiments, the local networks 20 to 24 belong to various network operators. In another exemplary embodiment, the telecommunication system 14 and the adapter unit 90 are connected to different exchanges or to different modules of an exchange in the same local network.

The data is transferred in the Internet 12 in data packets in accordance with the Internet protocol. Each data packet contains a data header including a destination address and a sender address. Payload data e.g. voice data or signaling data is contained in a data body part. The data packets are transferred in a connectionless manner, i.e. without connection setup phase and connection cleardown phase, on at least one lower protocol level. The Internet 12 contains a multiplicity of local data packet transfer networks LAN (Local Area Network) and long-range transfer networks WAN (Wide Area Network).

The telecommunication system 14 is e.g. of the type HiPath 4000 from the company Siemens AG and contains:
a control unit 30,
a connection matrix 32,
at least one exchange module 34,
at least one subscriber connection module 36,
and at least one IP module 38.

The control unit 30 controls inter alia switching processes in the telecommunication system 14, checks the utilization of user facilities by the subscribers of the private telecommunications network 10, and records charging data for the internal charging within the private telecommunications network 10. The control unit contains one or more processors, for example.

The connection matrix 32 is controlled by the control unit 30 and is used for switching call data from or to the exchange module 34, the subscriber connection module 36 or the IP module 38. The switching in the connection matrix 32 takes place e.g. by means of the interleaving of time slots.

Connected to the exchange module 34 is an exchange line 40 or a plurality of exchange lines 40 to 46, whose other end is connected to an exchange (not shown) of the local network 20. The call data is transferred on up to 30 speech/data channels and one signaling channel in accordance with the ISDN protocol (Integrated Service Digital Network) on each exchange line using time-division multiplexing, for example. The exchange module 34 processes signaling messages coming from the local network 20 in accordance with the ISDN protocol and sends signaling messages into the local network 20 in accordance with the ISDN protocol.

Connected to the subscriber connection module 36 via connection lines 50 to 56 is a multiplicity of terminals 60 to 64 e.g. terminals of the type Optiset from the company Siemens AG. The voice data between the terminals 60 to 64 and the subscriber module 36 is only transferred in voice channels using time-division multiplexing and not in data packets. The subscriber module 36 generates signaling messages in accordance with a proprietary stimulus protocol e.g. the protocol CorNet TS (Corporate Network Telephony Support). The terminals 60 to 64 are used by employees of the company which operates the private telecommunications network 10.

The IP module 38 is connected to the Internet 12 via a line 70. Data packets are sent into the Internet 12 and received from the Internet 12 with the aid of the IP module 38. The IP module 38 processes signaling data in accordance with the IP protocol and the TCP protocol (Transmission Control Protocol) and in the case of one alternative, and in particular for preparing a voice transfer, performs IP signaling on higher protocol levels e.g. in accordance with SIP (Session Initiation Protocol) as specified by the IETF (Internet Engineering Task Force) or in accordance with an ITU-T protocol of the H.323 protocol family.

Also in the IP module 38, voice data from circuit-switched transfer channels coming from the connection matrix 32 is extracted and inserted into data packets which are then transferred via the Internet 12. Conversely in the IP module 38, voice data coming from the Internet 12 is extracted from data packets and switched onwards in transfer channels of the connection matrix 32.

Connected to the IP data packet transfer network 16 in the branch office F1 are:
a line 72 to the Internet 12 and
IP telephones 80 to 84, e.g. fewer than ten IP telephones, e.g. of the type Optipoint from the company Siemens AG.

The IP telephone 80 contains e.g. as a plug-in card an $S_0$ adapter 90 which is connected both to the data packet transfer network 16 (see connection 92) and to an exchange connection line or so-called exchange line 100 which leads to an exchange (not shown) of the local network 22. Signaling for the interface $S_0$ takes place in accordance with the ISDN protocol on the exchange line 100.

Signaling data which arrives on the exchange line 100 is packed into data packets in the $S_0$ adapter 90 without protocol-based processing and tunneled via the Internet 12; see the signaling path 102 of the signaling data as indicated by the broken line from the $S_0$ adapter 90 via the Internet 12 and the IP module 38 to the control unit 14. The control unit processes the signaling data in the same way as signaling data which comes from the exchange module 34. In this case, control operations are carried out by the control unit 30 and the signaling data is answered in accordance with the ISDN protocol. The reply signaling data is routed to the IP module 38 where it is packed into data packets and tunneled back to the $S_0$ adapter 90 via the Internet 12; see broken line signaling path 102.

The voice data is extracted from the B channel (B1, B2) of the exchange line 100 and e.g. transferred via the Internet 12 to the IP module 38; see voice data path 104. A real-time protocol, e.g. the RTP (Real Time Protocol) and the UDP (User Datagram Protocol) as specified by the IETF, is used for transferring the voice data, for example. Voice compression as per ITU-T standard G.723 or G.729 in the direction of the Internet 12 and voice decompression in the direction of the exchange line 100, for example, are performed in the $S_0$ adapter 90. Therefore tunneling does not take place in relation to the voice data.

In the exemplary embodiment, a telephone connection is to be set up from the local network 22 to the IP telephone 80 in accordance with the signaling data which arrives via the exchange line 100. The control unit 30 therefore notifies the IP telephone 80 of the incoming call via the Internet 12 with the aid of the IP module 38; see signaling path 106. A proprietary stimulus protocol, for example, is used for signaling to the IP telephone 80, e.g. the Siemens-internal protocol CorNet TS (Corporate Network-Telephony Support) tunneled via the proprietary protocol CorNet TC (Corporate Network-Tele Commuting) which is described in greater detail below and TCP/IP. The protocol messages of this protocol are tunneled via the Internet 12 and relate to simple signaling operations such as "Key x depressed" or "LED x on or off".

In order to prepare for the transfer of the voice data, e.g. the protocol SIP (Session Initiation Protocol) or a protocol of the H.323 protocol family can be used. For signaling on the signaling path 106, the protocol SIP or a signaling protocol as per the H.323 protocol family is used as an alternative instead of the protocol CorNet TS.

If the subscriber using the IP telephone 80 has accepted the incoming call, the voice data which arrived in the IP module 38 via the voice data path 104 is also transferred from the IP module 38 to the IP telephone via the Internet 12; see voice data path 108, on which e.g. a real-time transfer protocol without tunneling is again used. If the subscriber using the IP telephone 80 speaks, the voice data which is thus generated is routed in a reverse direction via the voice data paths 108 and 104 to the adapter 90, unpacked and forwarded via the exchange line 100 in a time slot.

Also if the IP telephone 80 wanted to set up a connection into the local network 22, the signaling paths 106 and 102 and the voice transfer paths 108 and 104 are used. In this case, ISDN signaling data is generated by the control unit 30 and tunneled via the signaling path 102 to the $S_0$ adapter 90 and sent to the exchange of the local network 22 after conversion. The reply signaling data arriving from the exchange of the local network 22 is then tunneled from the $S_0$ adapter 90 via the Internet 12 to the control unit 14.

The procedure is the same if the IP telephone 82 of the branch office F1 or an IP telephone 84 is used instead of the IP telephone 80.

Connected to the IP data packet transfer network 18 in the branch office F2 are:
a line 110 to the Internet 12 and
an IP telephone 112 and an IP telephone 114, e.g. IP telephones of the type Optipoint from the company Siemens AG.

The IP telephone 112 contains e.g. as a plug-in card an $S_0$ adapter 116 which is connected both to the data packet transfer network 18 (see connection 118) and to an exchange line 120 which leads to an exchange (not shown) of the local network 24. Signaling for the interface $S_0$ takes place in accordance with e.g. the ISDN protocol on the exchange line 120. The above-described operations for the branch office F1 also apply for the branch office F2 when the local network 24 is involved in a telephone connection instead of the local network 22.

Figure 2:
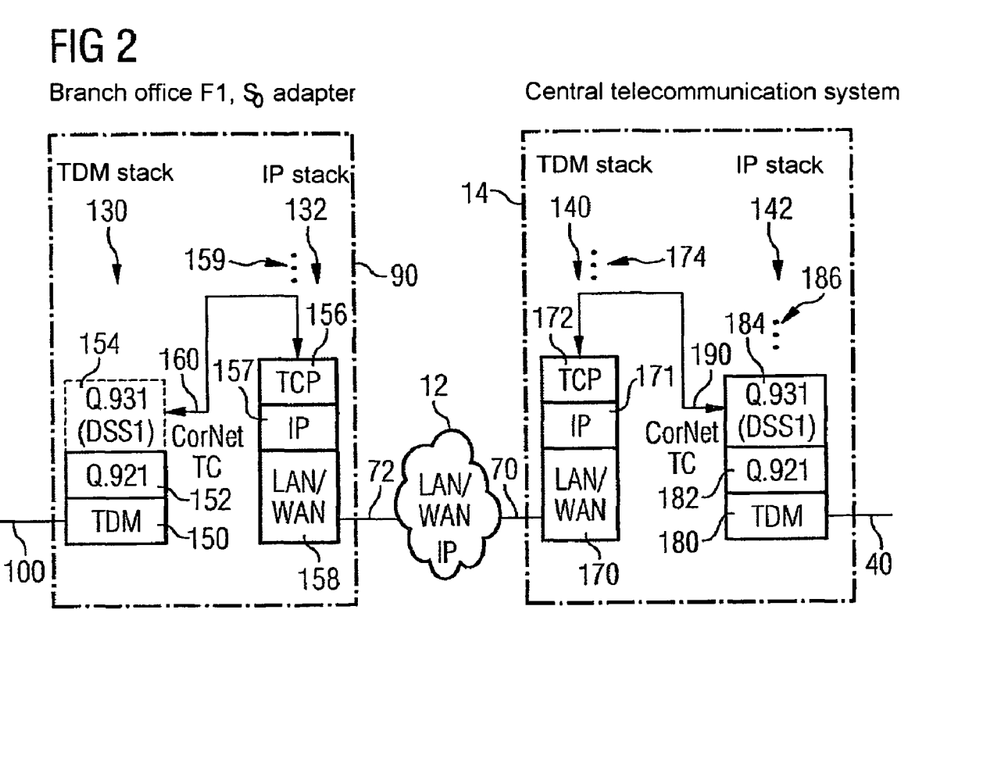
FIG. 2 shows a protocol stack for the normal operating mode in an adapter unit and in a central telecommunication system of the private telecommunications network.

In relation to the normal operating mode, FIG. 2 shows two protocol stacks 130 and 132 in the adapter unit 90 and two protocol stacks 140 and 142 in the central telecommunication system 14. The functions of the protocols belonging to the protocol stacks 130 to 142 are performed e.g. by a circuit arrangement without a processor or by a circuit arrangement with a processor which executes instructions which are stored in a storage unit.

In accordance with the OSI (Open Systems Interconnection) model, the protocol stack 130 includes as its lowest protocol level 150, i.e. as a physical layer or bit transfer layer, a TDM layer (Time Division Multiplex), such that the signaling data is transferred in a signaling channel in accordance with the time-division multiplexing method. The second protocol level 152, i.e. the data link layer, of the protocol stack 130 is operated e.g. according to ITU-T standard Q.921.

While the protocol levels 150 and 152 in the adapter 90 are processed completely, signaling messages of the third protocol level 154, i.e. the network layer, are merely recognized but not processed in the adapter 90. The third protocol level concerns the signaling e.g. in accordance with ISDN subscriber protocol DSS1 (Digital Signaling System No. 1); see Q.931 ff. of the ITU-T. The data belonging to this protocol is copied and tunneled via the Internet 12.

For the purpose of tunneling, use is made of a proprietary protocol, for example, such as the Siemens-internal protocol CorNet TC (Corporate Network-Tele Commuting), which recognizes the following basic reports:

"Log On" or "Log Off" for signaling the setup or cleardown of a data connection, "Keep Alive" for monitoring the data connection, a container report in which e.g. signaling messages can be transported in accordance with other proprietary protocols or also the signaling messages to be tunneled can be transported in accordance with DSS1.

In terms of switching, CorNet TC belongs to the link level 2.

The TCP protocol (Transmission Control protocol) is used in the fourth protocol level, i.e. in the transport protocol level of the IP protocol stack 132. The Internet protocol IP lies underneath this in the third protocol level, i.e. in the network protocol level. The two lower protocol levels in the IP protocol stack 132 are combined into a network access protocol level 158 and represent a LAN or WAN transfer protocol e.g. an Ethernet protocol. Higher protocol levels 159 of the IP protocol stack 132 are indicated by dots in FIG. 2.

The tunneling of the signaling data in the adapter 90 is illustrated by means of a double arrow 160 in FIG. 2 and takes place both in the direction from the exchange line 100 to the line 72 and in the opposite direction from the line 72 to the exchange line 100. The CorNet TC container reports are sent from the adapter 90 into the Internet 12 or received from the Internet 12 as IP data packets.

In the exemplary embodiment, the functions of the IP protocol stack 132 are performed by the IP telephone 80, which also uses the functions of such a IP protocol stack 132 for the IP telephony. The telephone 80 contains an internal bus system into which an $S_0$ card is plugged. Untunneled DSS1 messages between the $S_0$ card and the telephone 80 are exchanged via the internal bus system. Consequently, multiple use is made of software and hardware and the additional switching-related and software-related burden for the adapter 90 is small.

In another exemplary embodiment, the $S_0$ adapter 90 is implemented independently of an IP telephone and contains in this case a dedicated connection to the data packet transfer network 16 of the branch office. The functions of both protocol stacks 130 and 132 are also performed in the $S_0$ adapter 90 in the case of the alternative exemplary embodiment.

In its right-hand part, FIG. 2 shows the protocol stacks 140, 142 which correspond to the protocol stacks 130, 132. The protocol stack 140 is constructed in the same way as the protocol stack 132 and contains:

a lower network access protocol level 170 whose functions are provided e.g. by the IP module 38, a third protocol level 171 situated thereupon for implementing the IP protocol, a fourth protocol level 172 for implementing a transport protocol, e.g. TCP, wherein the functions of the protocol levels 171 and 172 are performed e.g. likewise by the IP module 38, and further higher protocol layers 174 which are indicated by dots but are not explained in further detail.

The protocol stack 142 is constructed in a similar manner to the protocol stack 130 and contains:

a lower protocol level 180 which works in accordance with a time-division multiplexing method, a second protocol level which works e.g. in accordance with ITU-T standard Q.921 and creates a data transfer connection between the exchange module 34 and the exchange in the local network 20, a protocol level 184 which, unlike the protocol level 154, is fully processed and performs functions of the DSS1 protocol, and higher protocol layers 186 which are indicated by dots but are not explained in further detail.

The protocol level 184 of the protocol stack 142 is used both for signaling in the direction of the local network 20 and for onward routing of signaling messages which have been tunneled through the Internet 12 to the control unit 30 or for onward routing of signaling messages which come from the control unit 30 and must be tunneled through the Internet 12; see double arrow 190.

In the telecommunication system 14, the DSS1 signaling messages which have been tunneled through the Internet 12 are unpacked from the CorNet TC container reports and forwarded to the control unit 30. Conversely, the DSS1 signaling messages which must be tunneled through the Internet 12 are inserted into CorNet TC containers and then into IP data packets.

If the Internet 12 or the central telecommunication system 14 fails, it is not possible to control the telephones 80 to 84, 112, 114 in the branch offices F1, F2 or the exchange lines 100, 120 leading to the branch offices F1, F2 without the additional measures explained below.

Figure 3:
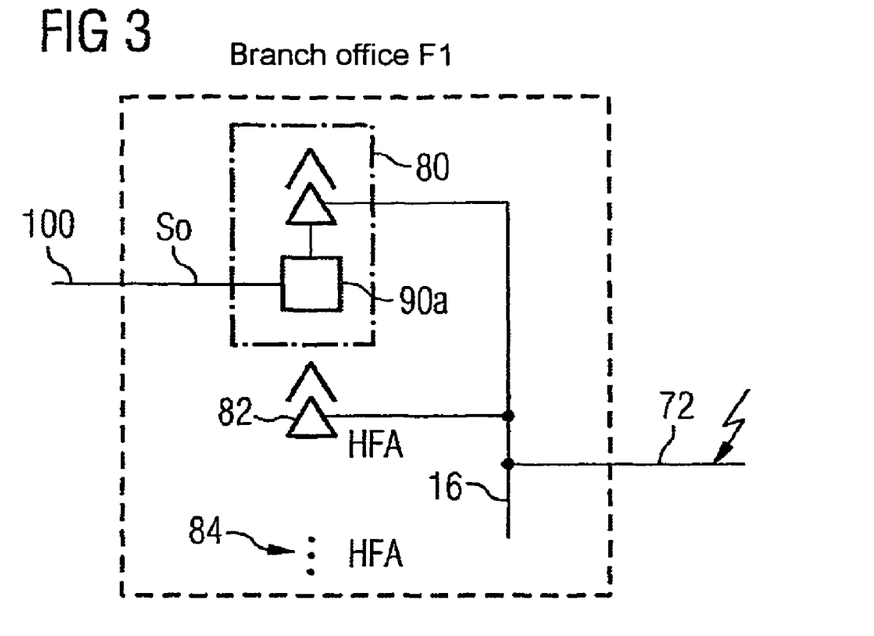
FIG. 3 shows an exemplary embodiment of an operating mode of the private telecommunications network.

FIG. 3 shows a first variant of an emergency operating mode, in which the functions of the adapter unit 90 are performed by an adapter unit 90a. The IP telephone 80 detects the failure of the Internet 12 or the failure of the telecommunication system 14.

The IP telephone 80 which includes the $S_0$ adapter unit 90a thereupon assumes the role of a small telecommunication system (PBX—Private Branch Exchange) including the IP telephones 80 to 84 as extension terminals. The IP telephone 80 operates the $S_0$ interface of the $S_0$ adapter unit 90a in the same way as a small telecommunication system which has an $S_0$ ISDN switching center interface.

For their part, the IP telephones 82, 84 detect the failure and switch to a substitute IP address of the emergency telecommunication system. The IP telephones 82, 84 automatically register themselves in the emergency operating mode with the small telecommunication system which is situated in the IP telephone 80 or in the $S_0$ adapter unit 90a. In the emergency operating mode, therefore, all IP telephones 80, 82 and 84 can handle incoming and outgoing switching center calls or exchange calls via the unit comprising IP telephone 80 and $S_0$ adapter unit 90a as extension subscribers of the emergency telecommunication system.

In the emergency operating mode, the IP telephone 80 and its $S_0$ adapter unit 90a work as the central telecommunication system 14 in relation to the IP telephones 82, 84. In the exemplary embodiment, the telecommunication system 14 is a telecommunication system of the type HiPath 4000 from the company Siemens AG. The IP telephones 82, 84 as so-called HFA-IP telephones (HiPath Feature Access) therefore switch over from the central telecommunication system 14 to IP telephone 80 as an emergency telecommunication system. The interface protocols are retained when switching over, particularly proprietary interface protocols such as the CorNet TS protocol or the CorNet IP protocol.

In the exemplary embodiment, the IP telephone 80 itself is likewise operated at the emergency telecommunication system in the emergency operating mode. In an alternative exemplary embodiment, the telephone 80 is operated as a main connection line telephone in the emergency operating mode, wherein the emergency telecommunication system and the telephone share the $S_0$ bus.

In the exemplary embodiment which is illustrated in FIG. 3, no DSS1 signaling messages are tunneled via an IP network in the emergency operating mode. The DSS1 signaling messages arrive at the IP telephone 80 via an internal bus system of the IP telephone 80.

Figure 4:
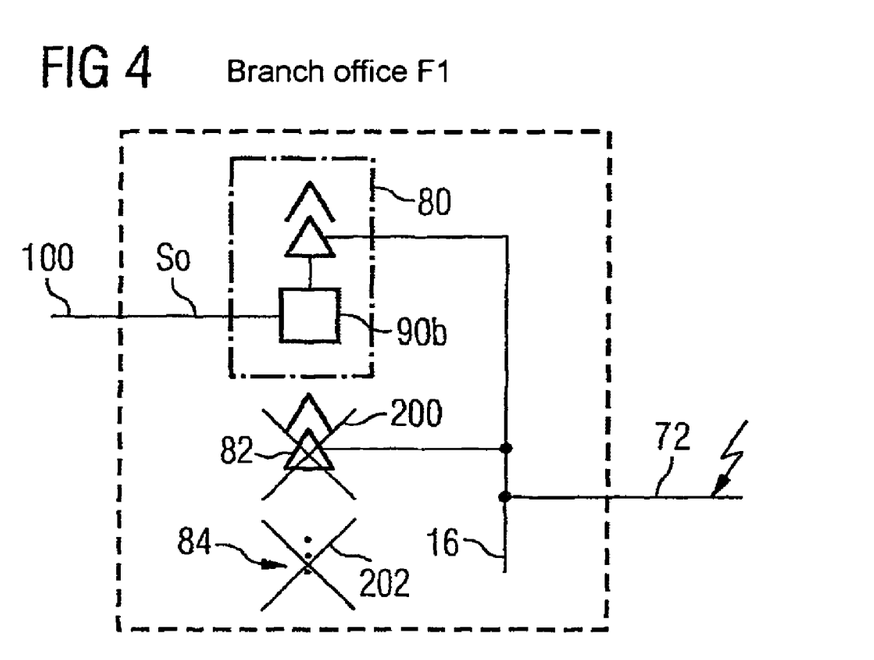
FIG. 4 shows another exemplary embodiment of an operating mode of the private telecommunications network.

FIG. 4 shows a very simple second variant of an emergency operating mode, in which the functions of the adapter unit 90 are performed by an adapter unit 90b. According to the second variant, in the emergency operating mode the IP telephone 80 and the $S_0$ adapter unit 90b work as an ISDN switching center telephone or an ISDN telephone which is directly connected to an exchange.

The IP telephone 80 detects the failure of the Internet 12 or the failure of the telecommunication system 14. As a result of this, the IP telephone 80 uses the $S_0$ interface in the same way as an ISDN telephone directly at an exchange. Therefore the IP telephone 80 can handle incoming calls from the local network 22 and outgoing calls into the local network 22 as an ISDN telephone in the emergency operating mode. The other IP telephones 80, 82 cannot handle calls in the emergency operating mode; see cancellations 200 and 202.

In the emergency operating mode according to FIG. 4, it is likewise the case that no DSS1 signaling messages are tunneled via a data packet transfer network. The DSS1 signaling messages are transferred between $S_0$ card and telephone 80 via an internal bus system of the IP telephone. Therefore no functions of the IP protocol stack 132 are performed in the emergency operating mode.

Figure 5:
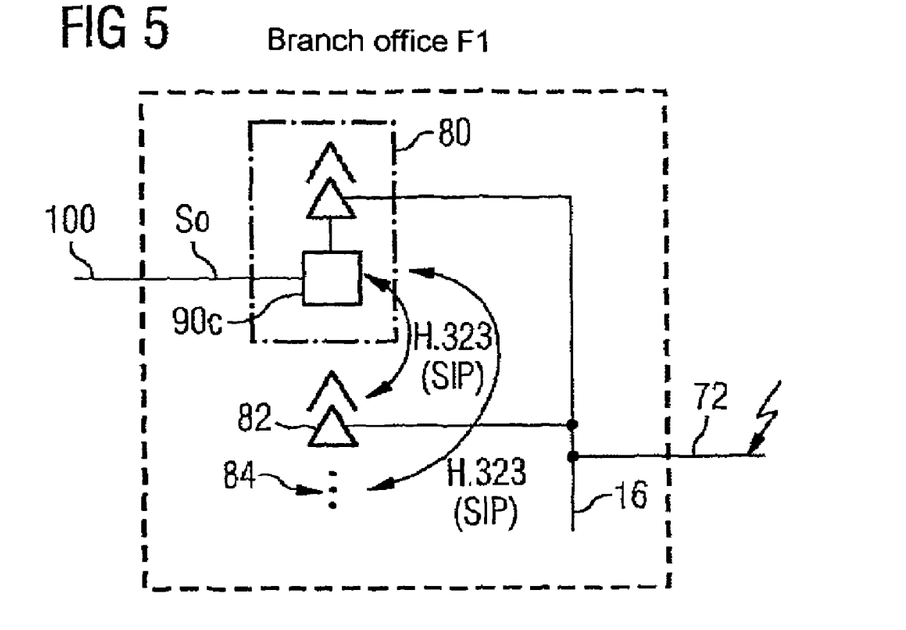
FIG. 5 shows another exemplary embodiment of an operating mode of the private telecommunications network.

FIG. 5 shows a third variant of an emergency operating mode, in which the functions of the adapter unit 90 are performed by an adapter unit 90c. According to the third variant, in the emergency operating mode the $S_0$ adapter unit works as an H.323/ISDN gateway or as a SIP/ISDN gateway in an alternative exemplary embodiment. A gateway is also referred to as a network interworking unit between networks having different signaling protocols.

The $S_0$ adapter unit 90c detects the failure of the Internet 12 or of the telecommunication system 14. As a result of this, the $S_0$ adapter unit works as an H.323/ISDN gateway or an H.323/ISDN network access unit which assumes responsibility for the conversion between the IP signaling in accordance with H.323 and ISDN signaling (e.g. DSS1) in the case of exchange connections of the IP telephones 80 to 84 involving the local network 22. At the same time, the $S_0$ adapter unit 90c assumes the role of the gatekeeper in relation to the telephones 80 to 84. The IP telephones 80 to 84 register themselves with the $S_0$ adapter unit 90c as H.323 terminals in the emergency operating mode, e.g. after detecting the failure.

In an alternative exemplary embodiment, the $S_0$ adapter unit 90c works as a SIP/ISDN gateway in the emergency operating mode, such that a conversion between a SIP signaling and an ISDN signaling is performed in the $S_0$ adapter unit 90c. The $S_0$ adapter unit assumes the role of the SIP registrar. The IP telephones 80 to 84 register with the $S_0$ adapter unit as SIP terminals.

In an alternative exemplary embodiment, in the emergency operating mode as per FIG. 5 the telephone 80 is operated as a main connection line telephone, wherein the network access unit and the telephone 80 share the $S_0$ bus.

In the exemplary embodiment according to FIG. 5, it is again the case that no DSS1 signaling messages are tunneled via an IP network in the emergency operating mode. The DSS1 signaling messages arrive at the IP telephone 80 via an internal bus system of the IP telephone 80 and are converted there in the network access unit. The IP protocol stack 132 can nonetheless be used for the connection of the telephone 80 to the IP network 16.

Figure 6:
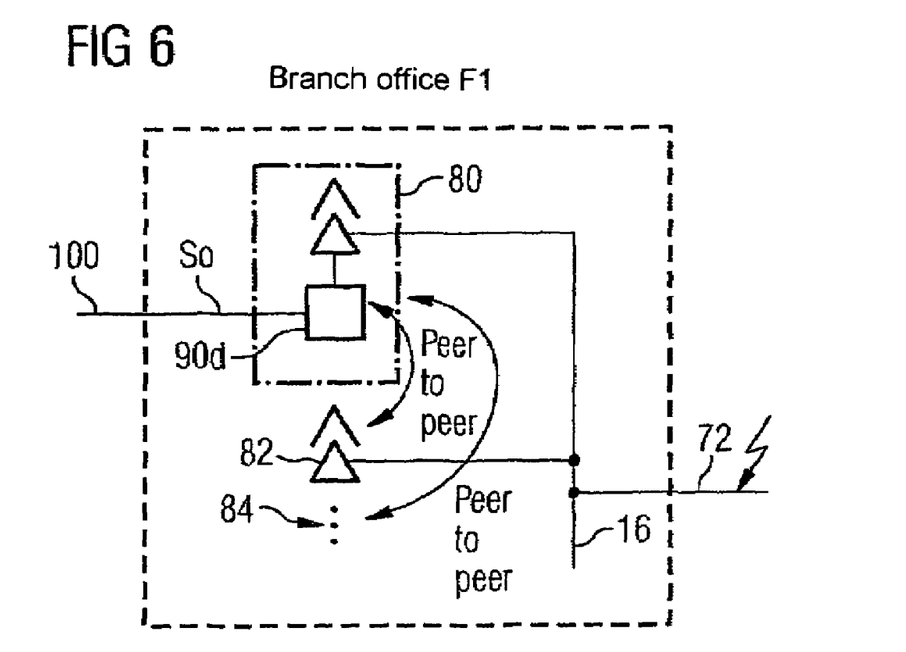
FIG. 6 shows another exemplary embodiment of an operating mode of the private telecommunications network.

FIG. 6 shows a fourth variant of an emergency operating mode, in which the functions of the adapter unit 90 are performed by an adapter unit 90d. According to the fourth variant, in the emergency operating mode the $S_0$ adapter unit 90d and the IP telephones 80, 82 and 84 work as peer-to-peer terminals of a peer-to-peer architecture.

The $S_0$ adapter unit 90d detects the failure of the Internet 12 or of the telecommunication system 14. As a result of this, the $S_0$ adapter unit 90d works in relation to the IP telephone 80, 82 or 84 as a peer-to-peer terminal which implements the conversion between IP signaling in accordance with a peer-to-peer protocol and an ISDN protocol (e.g. DSS1) as a proxy or network interworking unit in the case of switching center connections of the IP telephone 80, 82 or 84. The telephones 80 to 84 also detect the fault and switch over to a substitute IP address of the network interworking unit.

In an alternative exemplary embodiment as per FIG. 6, in the emergency operating mode the telephone 80 is operated as a main connection line telephone, wherein the network access unit and the telephone 80 share the $S_0$ bus.

In the exemplary embodiment according to FIG. 6, it is again the case that no DSS1 signaling messages are tunneled via an IP network in the emergency operating mode. The DSS1 signaling messages arrive at the IP telephone 80 via an internal bus system of the IP telephone 80. The DSS1 signaling messages arrive at the IP telephone 80 via an internal bus system of the IP telephone 80 and are converted there in the network access unit. The IP protocol stack 132 can nonetheless be used for the connection of the telephone 80 to the IP network 16.

In summary, an enterprise network includes a central facility having an access to the public telephone network and decentrally located branch offices in other local network areas or other exchanges in addition to the central facility. The enterprise network operator operates both the telephone subscribers of the branch offices and their switching center connections controlled from the central system, by tunneling the signaling of the switching center connections of the branch offices via the LAN/WAN which connects central facility and branch offices.

The invention provides means for implementing an inexpensive emergency operation in the event of a failure of the central facility or in the event of a failure of the LAN/WAN between the central facility and the branch offices, in particular with regard to the manufacturing and service costs. For example, if an emergency telecommunication system was installed in every branch office in order to allow local switching center connections for branch-office subscribers during emergency operation without connection to the central facility, the operating costs and service costs would be orders of magnitude higher in particular in the case of small branch offices having only few telephone subscribers and correspondingly modest telephony requirements.

In all of the described variants, the $S_0$ interface of the branch offices is either a telecommunication system connection or a multiple device connection. Alternatively, for example, an analog interface with associated analog signaling protocol is also used instead of an $S_0$ interface in the branch offices.

The invention claimed is:

1. An adapter unit operatively connected to an Internet Protocol (IP) phone, comprising:
   a channel send-receive unit that sends signaling data to an exchange of a circuit-switched telecommunications network and receives signaling data from the exchange;
   a data packet send-receive unit that sends data packets via a data packet transfer network towards a first telecommunication system and receives data packets from the first telecommunication system via the data packet transfer network, the data packets sent and received during a normal operating mode;
   a data insertion-extraction unit that inserts the signaling data received by the channel send-receive unit into a data packet and forwards the packet to the data packet send unit and that extracts signaling data from a data packet received by the data packet receive unit and forwards the extracted signaling data to the channel send unit, the data inserted and extracted during the normal operating mode; and
   an operating mode switchover unit that switches over from the normal operating mode to an emergency operating mode if a fault occurs on the side of the data packet transfer network,
   wherein the emergency operating mode ensures telecommunication via the circuit-switched telecommunications network, and
   wherein the signaling data is not processed by the adapter during the normal operating mode.

2. The adapter unit according to claim 1, further comprising a protocol conversion unit that converts the signaling data between a circuit-switched protocol and a data-packet protocol, the conversion performed during the emergency mode.

3. The adapter unit according to claim 2, further comprising a network access unit that performs network access functions for a plurality of terminals of a data packet transfer network during the emergency mode, the functions selected from the group consisting of a gatekeeper function in accordance with a protocol of the H.323 protocol family, a SIP registrar function in accordance with a SIP protocol, and SIP registrar function in accordance with a protocol based on the SIP protocol.

4. The adapter unit according to claim 3,
   wherein the plurality of terminals are IP phones including the first IP phone,
   wherein the number of terminals is less than 16, and
   wherein during the emergency mode the signaling messages are not sent via the data packet transfer network.

5. The adapter unit according to claim 4, wherein at least one of the terminals is adapted to detect the fault and change to an IP address of the adapter unit or of the first IP phone.

6. The adapter unit according to claim 2, further comprising a terminal unit that performs a peer-to-peer connection function during the emergency operating mode.

7. The adapter unit according to claim 1,
   wherein the data packets are transferred in accordance with an Internet protocol in the data packet transfer network,
   wherein the circuit-switched telecommunications network is a fixed network or a mobile radio network,
   wherein the signaling data is adapted in accordance with a signaling protocol for exchange lines between an exchange and a terminal or between the exchange and the first telecommunication system, and
   wherein the signaling protocol is DSS1 or based on DSS1.

8. The adapter unit according to claim 1, wherein the fault occurs at the first telecommunication system.

9. The adapter unit according to claim 1, wherein during the emergency operating mode:
   the operating mode switchover unit forwards the signaling data to a second telecommunication system that is different than the first telecommunication system used in the normal operating mode, and
   signaling data received from the second telecommunication system is sent to the exchange via the channel send unit.

10. The adapter unit according to claim 1, wherein during the emergency operating mode:
    the operating mode switchover forwards the signaling data to a subscriber terminal, and
    the signaling data received from the subscriber terminal is sent to the exchange via the channel send unit.

11. A method for operating a telecommunications system, comprising:
    receiving signaling data of a circuit-switched telecommunications network;
    providing a normal operating mode, comprising:
      tunneling the received signaling data via a data packet transfer network from the adapter unit to a first telecommunication system, wherein a signaling protocol in the received signaling data is not processed by the adapter, and
      processing the tunneled signaling data in the first telecommunication system in accordance with the signaling protocol; and
    providing an emergency operating mode.

12. The method according to claim 11, wherein the normal operating mode further comprises:
    detecting a failure of the data packet transfer network or of the first telecommunication system in the normal operating mode, and
    automatically switching over into an emergency operating mode after the detection of the failure.

13. The method according to claim 12, wherein the emergency operating mode further comprises:
    detecting a reactivation of the data packet transfer network or of the first telecommunication system, and
    automatically switching over into the normal operating mode after the detection of the reactivation.

14. The method according to claim 11, wherein the emergency operating mode further comprises:
    forwarding the signaling data from a channel receive unit of an adapter to a second telecommunication system, the second telecommunication system having performance features more restrictive than the first telecommunication system used in the normal operating mode,
    forwarding signaling data from the second telecommunication system to the channel send unit, and
    wherein the functions of the telecommunication system performed by a first IP telephone.

15. The method as according to claim 14, further comprising:
    detecting the failure and reactivation by a second IP telephone; and registering the second IP telephone at the second telecommunication system, wherein retaining the interface protocol in comparison with the normal operating mode is retained.

16. The method as according to claim 14, wherein the emergency operating mode further comprises:
   forwarding the signaling data received by the channel receive unit to an IP telephone, and
   forwarding signaling data sent by the IP telephone to the channel send unit,
   wherein the IP telephone performs functions of a telephone which is operated directly at the circuit-switched telecommunications network.

17. The method as according to claim 16, wherein the emergency operating mode further comprises:
   an IP telephone (80), which in the emergency operating mode performs functions of a telephone which is operated directly at the circuit-switched telecommunications network (20, 22), detecting the failure or the reactivation.

18. The method as according to claim 13, wherein the emergency operating mode further comprises:
   performing a protocol conversion of the signaling data into a signaling protocol for a data packet transfer network,
   transferring the converted signaling data to an IP telephone,
   receiving signaling data in accordance with a signaling protocol for a data packet transfer network from an IP telephone, and
   performing a protocol conversion for the received signaling data in accordance with a protocol for the signaling in the circuit-switched telecommunications network.

19. The method as according to claim 18, wherein the emergency operating mode further comprises:
   detecting the failure or the reactivation by an adapter, and
   registering at least one IP telephone with the adapter unit or setting up a peer-to-peer connection between the adapter unit and the at least one IP telephone.

20. The method according to claim 19, wherein the signaling protocol for the data packet transfer network is a protocol of the H.323 protocol family or a SIP protocol or a peer-to-peer protocol.

21. A method for operating a telecommunications system, comprising:
   providing an adapter unit operatively connected to a circuit-switched telecommunications network, operatively connected to a telecommunication system via a data network and operatively connected to an IP telephone,
   receiving a first signaling data of the circuit-switched telecommunications network by the adapter unit, the first signaling data having a circuit-switched-signaling protocol, and
   providing a normal operating mode, comprising:
      tunneling the first signaling data via the data packet transfer network from the adapter unit to the first telecommunication system, wherein the received circuit-switched-signaling protocol is not processed by the adapter,
      processing the circuit-switched-signaling protocol in the telecommunication system in accordance with the signaling protocol,
      detecting a failure of the data packet transfer network or of the first telecommunication system, and
      automatically switching over into an emergency operating mode after the detection of the failure; and
   providing an emergency operating mode:
      converting the received circuit-switched-signaling protocol to a data-packet-signaling protocol to form a first data packet,
      sending the first data packet to the IP telephone,
      receiving by the adapter unit a second data-packet having the data-packet-signaling protocol,
      converting the data-packet-signaling to the circuit-switched-signaling protocol forming a second-circuit-switched data,
      sending the second-circuit-data to the circuit switched network,
      detecting a reactivation of the data packet transfer network or of the first telecommunication system, and
      automatically switching over into an normal operating mode after the detection of the reactivation.

22. The method according to claim 21, wherein the IP telephone registers with the adapter after the failure.

23. The method according to claim 21, wherein the adapter is operatively connected less than 16 IP telephones.

* * * * *